Nov. 11, 1941.　　　J. H. McNABB　　　2,262,509
IRIS CONTROL MECHANISM
Filed June 18, 1940
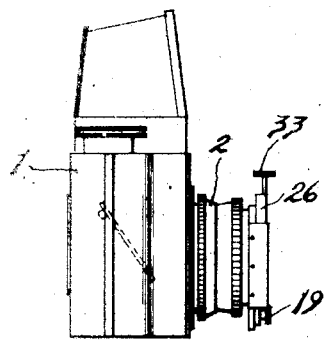
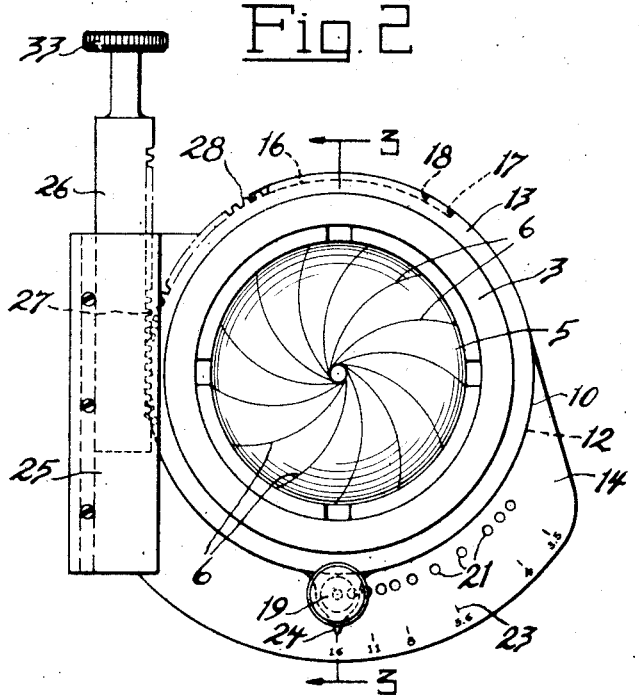
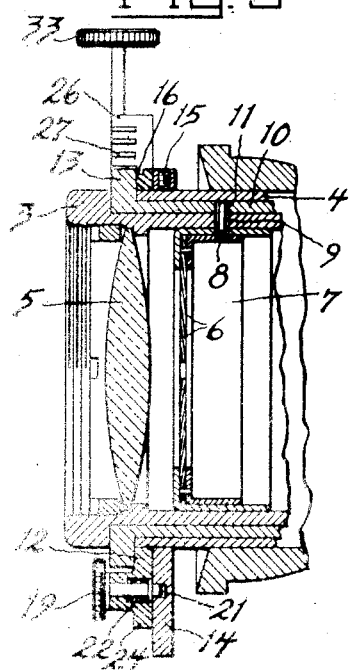
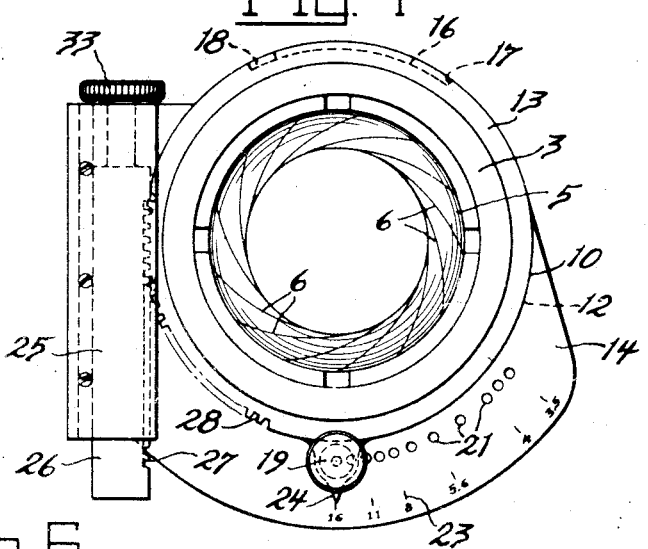
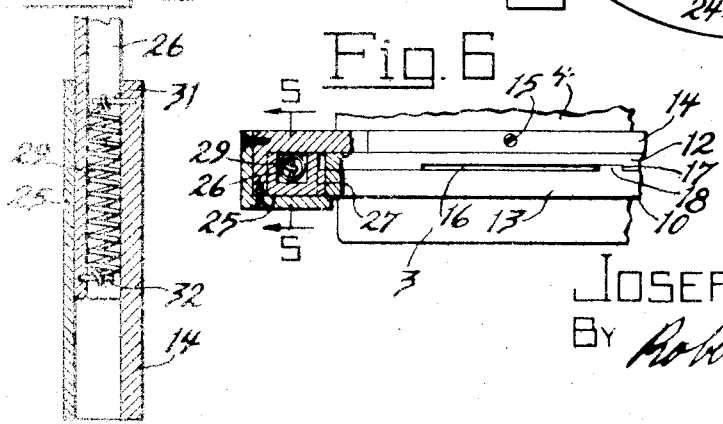
INVENTOR
JOSEPH H. McNABB
BY Robert F. Miehle Jr.
ATTY.

Patented Nov. 11, 1941

2,262,509

UNITED STATES PATENT OFFICE 2,262,509

IRIS CONTROL MECHANISM

Joseph H. McNabb, Winnetka, Ill., assignor to The Bell & Howell Company, Chicago, Ill., a corporation of Illinois Application June 18, 1940, Serial No. 341,162

2 Claims. (Cl. 95—64)

My invention relates particularly to iris control mechanism for photographic camera lenses and has for its instant object the provision of an iris control mechanism which provides for a selected iris setting and while retaining the selected setting permits of the iris being temporarily moved out of the adjustment thereof conforming with the selected setting, the invention having particular application to direct viewing photographic cameras with a view toward quickly and conveniently opening the iris of the photographic lens to obtain maximum light for viewing and returning it to its previously set adjustment for photographing.

With this object in view my invention consists in certain features of novelty in the construction, combination, and arrangement of parts by which the said object and certain other objects, hereinafter appearing, are effected all as fully described with reference to the accompanying drawing and more particularly pointed out in the appended claims.

In the said drawing—

Figure 1 is a reduced side elevation of a photographic camera of the reflex direct viewing type and having the photographic lens thereof equipped with the iris control mechanism of my invention;

Figure 2 is a front elevation of the photographic lens of the camera;

Figure 3 is a partial sectional view substantially on the line 3—3 of Figure 2;

Figure 4 is a view similar to Figure 2 showing parts in positions different than those in which they are shown in Figure 2;

Figure 5 is a partial sectional view substantially on the line 5—5 of Figure 6, and Figure 6 is a partial top plan view of the lens with parts broken away and shown in section.

Referring to the drawing, I designates a usual photographic camera of the reflex direct viewing type which is equipped with a photographic lens generally designated at 2. See Figure 1. The lens proper is of a usual type and involves a usual lens barrel structure, the forward portion of which consists of concentric sleeves 3 and 4 fixed together, and the inner sleeve 3 of which carries therein a forward lens element 5 and an iris mechanism to the rear of the lens element. See particularly Figure 3.

The iris mechanism is of usual construction and involves leaves 6 forming the iris opening and adjustable to vary the iris opening by means of an angularly movable sleeve 7 operatively connected with the leaves. The sleeve 7 is provided with a radial pin 8 which extends outwardly through an angular slot 9 through the sleeve 3 for adjustment of the iris from the exterior of this sleeve.

An adjusting sleeve or ring 10, concentric with the lens barrel structure, is mounted on the exterior of the sleeve 3 for angular movement with respect thereto and the pin 8 is engaged in a radial aperture 11 of the ring 10 whereby the iris opening is adjusted by angular movement of this ring.

A setting ring 12, concentric with the lens barrel structure, is mounted on the exterior of the sleeve 4 for angular movement with respect thereto immediately to the rear of a circumferential flange 13 on the forward end of the ring 10, and a stationary ring 14 engaged on the sleeve 4 immediately to the rear of the ring 12 is secured with the sleeve 4 by means of a set screw 15 and maintains the ring 12 axially between it and the flange 13.

The forward face of the ring 12 is provided with an angularly extending depression 16 forming an angularly facing shoulder or abutment 17, and the ring 10 is provided with a rearwardly projecting lug 18 extending into the depression 16 and forming an abutment engageable with the abutment 17 to form a one way connection operative to actuate the adjusting ring 10 from the setting ring 12 in one direction, i. e. counterclockwise in Figures 2, 4 and 6, and to permit independent movement of the adjusting ring in the same direction. As shown, the iris opening enlarges as the adjusting ring 10 is moved in this direction. Thus, assuming that the setting ring 12 is selectively positioned for less than the maximum iris opening, the adjusting ring 10 may be moved to the maximum iris opening position independently of the selected position of the setting ring 12, for the instant purpose of providing maximum light during direct viewing and thereafter reducing the iris opening to correspond with the selected positioning of the setting ring 12 for photographing with obvious convenience and quickness in altering the iris opening for viewing and photographing.

As shown, the setting ring 12 is releasably positioned in predetermined positions thereof by means of a headed locating stud 19 slidably mounted on the setting ring 12 and yieldably actuated into engagement with any one of a series of angularly spaced holes 21 on the stationary ring 14 by a spring 22 to releasably lock the setting ring in a selected position, manual withdrawal of the stud 19 in opposition to the spring 22 releasing the setting ring for angular movement.

The holes 21 are spaced in conformance with standard iris settings, and a corresponding scale 23 is inscribed on the ring 14 and cooperates with an index pointer 24 on the setting ring 12 to indicate the iris setting as provided by the positioning of the setting ring.

The stationary ring 14 is provided with a vertical slide 25 at one side of the flange 13 of the adjusting ring 10, and a plunger 26 is slidably mounted in this slide for longitudinal reciprocal movement tangentially of the adjusting ring. The plunger 26 is provided with a longitudinally extending gear rack 27 which meshes with a segment gear 28 on the flange 13 of the adjusting ring, so that reciprocation of the plunger effects oscillation of the adjusting ring. See Figures 2 to 6.

A tension spring 29 is arranged vertically within the slide 25 and has its upper end secured with the ring 14, as designated at 31, and has its lower end secured with the plunger 26, as designated at 32, so that this spring yieldably actuates the plunger upwardly and yieldably actuates the adjusting ring, through the meshing rack and gear connection above described, clockwise in Figures 2, 4 and 6, to decrease the iris opening, manual depression of the plunger, by means of a knob 33 at the upper end thereof, effecting opposite movement, counterclockwise in these figures, to increase the iris opening.

In the use of the mechanism, the setting ring 12 is positioned for the desired iris opening for photographing which results in the corresponding iris adjustment, as shown in Figure 1, by reason of the engagement of the abutments 17 and 18 acting in apposition to the spring 29. If it is desired to increase the iris opening, as is desirable for direct viewing, the plunger 26 is depressed, as shown in Figure 4, which results in increasing the iris opening without disturbing the setting ring. Release of the plunger 26 results in the return of the iris mechanism to its previously set adjustment for photographing.

While I have thus described my invention, I do not wish to be limited to the precise details described as changes may be readily made without departing from the spirit of my invention, but having thus described my invention I claim as new and desire to secure by Letters Patent the following:

1. In an iris control mechanism, the combination with an iris adjusting mechanism including an angularly movable iris adjusting member, of a selectively positionable setting member angularly movable in co-axial relation with said adjusting member, a one way connection operative to actuate said adjusting member from said setting member in one direction and permitting independent movement of said adjusting member in the same direction comprising cooperating abutment formations carried respectively by said adjusting and setting members, spring means yieldably actuating said adjusting member in the opposite direction, and means operative on said adjusting member in opposition to said spring means comprising a manually operable reciprocal member operatively connected with said adjusting member.

2. In an iris control mechanism, the combination with a lens barrel structure and an iris mechanism carried thereby and including an iris adjusting ring carried with said barrel structure in concentric relation therewith for angular movement with respect thereto, of a setting ring carried with said barrel structure in concentric relation therewith for angular movement with reference thereto and to said adjusting ring, means for selectively positioning said setting ring with reference to said barrel structure, a one way connection operative to actuate said adjusting ring from said setting ring in one direction and permitting independent movement of said adjusting ring in the same direction comprising cooperating angularly facing abutment formations respectively on said adjusting and setting rings, spring means yieldably actuating said adjusting ring in the opposite direction, a manually actuable plunger carried with said barrel structure for longitudinal reciprocal movement tangentially of said adjusting ring, and a meshing rack and gear operative connection between said plunger and adjusting ring.

JOSEPH H. McNABB.